INVENTOR

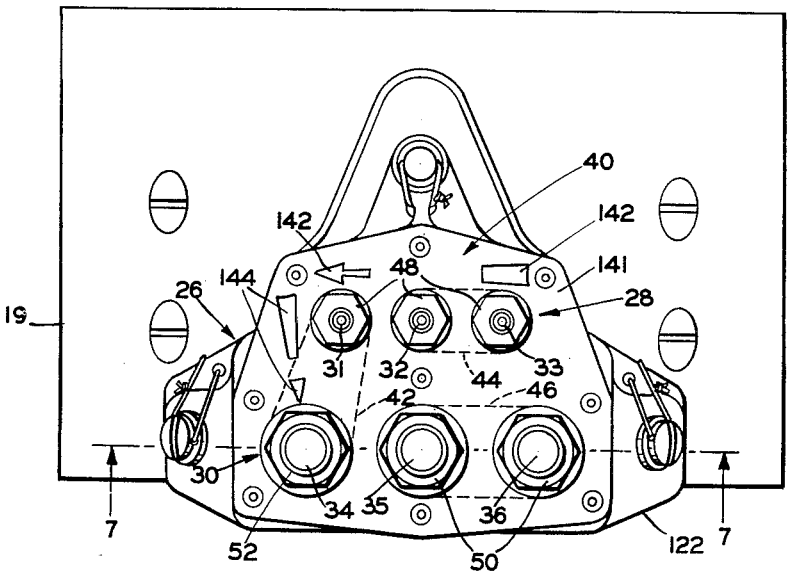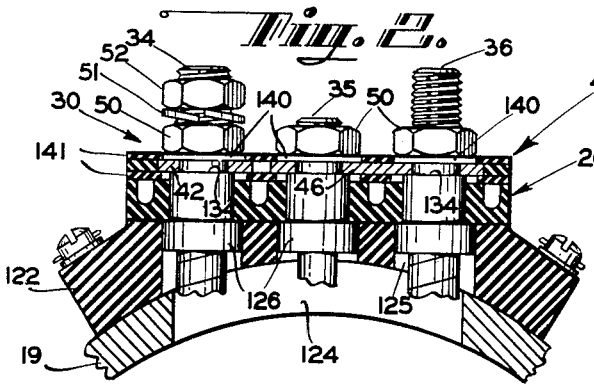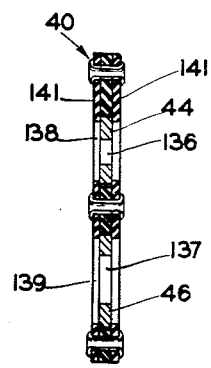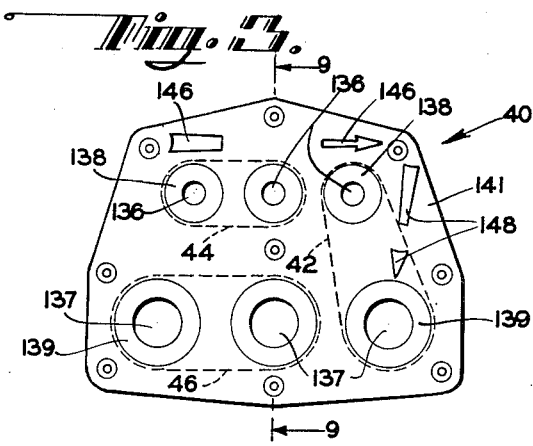

ALPHONSE V. ALVINO
BY Frederic H. Miller
ATTORNEY

Patented Nov. 28, 1950

2,531,719

UNITED STATES PATENT OFFICE 2,531,719

DIRECTION DETERMINING AND REVERSE OPERATING MEANS

Alphonse V. Alvino, Newark, N. J., assignor to Bendix Aviation Corporation, Teterboro, N. J., a corporation of Delaware Application February 14, 1947, Serial No. 728,490

2 Claims. (Cl. 318—296)

1

The invention hereof relates to direction determining and reverse operating means, and particularly to a motor reversing control.

Control or reversing means for motors have heretofore been of various constructions and operation, but there has apparently not been any means for quickly changing the direction of rotation of a motor rotor which has direction indicating means as herein set forth.

An object of the present invention is to avoid disadvantages of prior devices of the above indicated character, and to do so by novel effective means.

Another object is to provide a new and improved motor terminal structure.

Another object is to provide a motor terminal structure providing an indication of the direction set to determine the direction of rotation of the motor.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 1 is a face view of a motor circuit terminal supporting panel, and a terminal plate, with the plate mounted as it is for rotation of the motor armature in one direction;

Figure 2 is a view taken substantially along the line 7—7 of Figure 1;

Figure 3 is an opposite face view of the terminal plate of Figure 1, as it is positioned for rotation of the motor armature in the opposite direction;

Figure 4 is a section of the plate of Figure 1, taken substantially along the line 9—9 of Figure 3;

Figure 5:
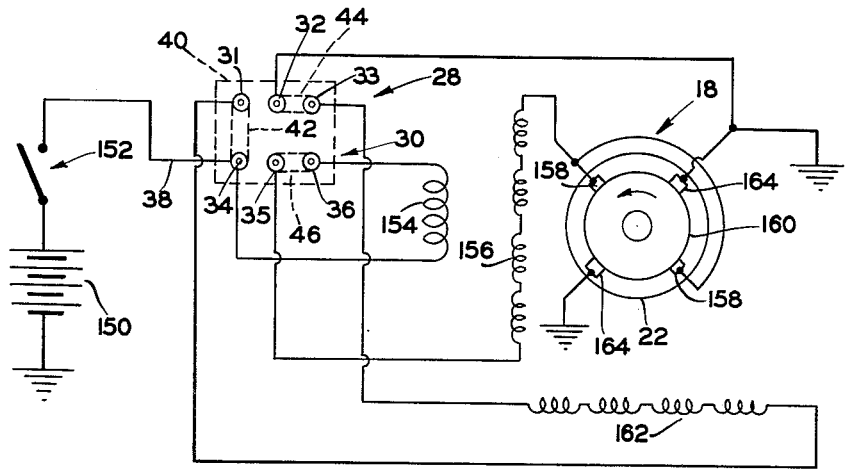
Figure 5 is a diagram of electrical circuits as existing when the plate shows as in Figure 1.

Referring now to the drawings the device comprises, in general, a motor circuit terminal supporting insulating panel 26, Figures 1 and 2, mounted on the casing 19 of the motor 18 having two rows 28 and 30, respectively, of three terminals each, namely terminals 31, 32 and 33 of row 28, and terminals 34, 35 and 36 of row 30, severally in the form of screw studs projecting

Figure 6:
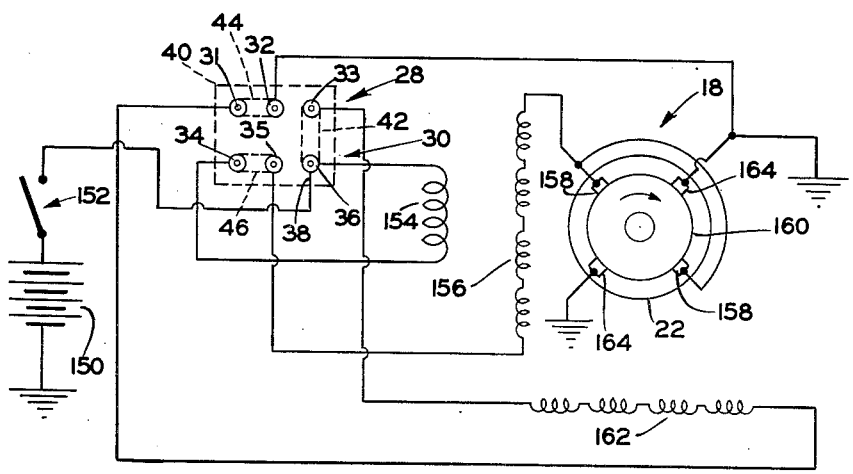
Figure 6 is a similar diagram of circuits as existing when the plate shows, as in Figure 3.

2 from the panel 26, two of the end terminals, namely the terminals 34 and 36, of one of which rows, namely the row 30, are each adapted to selectively receive a battery terminal 38, Figures 5 and 6.

An apertured insulating terminal plate 40, Figures 1, 2, 3 and 4, has embedded therein three jumpers 42, 44 and 46, one of which, namely, the jumper 42, has plate aperture registering openings fitting the corresponding end terminals 31 and 34, in one instance, and 33 and 36, in the other instance, of the rows 28 and 30. The other jumpers 44 and 46, each has similar openings fitting the other two elements of the respective rows, that is, the jumper 44, in one position of the panel 26, fits the terminals 32 and 33, and in the other position of the panel fits the terminals 31 and 32. Also, in one position of the panel, the jumper 46 fits the terminals 35 and 36 and in the other position fits the terminals 34 and 35. The plate 40 is selectively reversesidedly positionable on the panel 26 to effect the above mentioned fittings of the jumpers to the terminals, with the jumper openings fitting the panel terminals, and the battery terminal 38 correspondingly connected to one of the end terminals 34 or 36 of the row 30 to change the motor circuit from a condition, as indicated in Figure 5, under which the rotor 22 rotates in one direction to a condition, as indicated in Figure 6, under which the rotor rotates in the opposite direction. Means, such as nuts 48 and 50, and a lock nut 52, in this instance, are provided for securing the plate 40 to a panel 26, and the jumpers and battery terminal to the panel terminals in each selected position of the plate 40.

As indicated in Figures 1 and 2, the insulating panel 26 is mounted on and secured to an adapter or base 122 on the motor housing 19, with conductors of the circuit indicated in Figures 5 and 6, extending through apertures 124 and 125 in the housing 19 and the adapter 122, respectively, to the terminals 31 to 36, inclusive, as indicated in relation to the terminals 34, 35 and 36 in Figure 2. The terminals are solidly anchored in position and prevented from turning by polygonal ends 126, with the nuts 48 and 50 thereon for connecting the circuits and holding the plate 40 in place. The terminals 34 and 36 are longer or higher than the others to accommodate the battery terminal 38, a lock washer 51 and the lock nut 52. As shown, each terminal has a shoulder 134 engaged by one or another of the jumpers 42, 44 and 46, and, as better seen and illustrated by the jumpers 44 and 46 in Figure 4, each jumper has a hole 136 or 137, fitting a corresponding terminal, and surrounded by a recess 138 or 139, in outside layers 141, of the plate at opposite sides thereof to accommodate lock washers, as indicated by lock washers 140 in Figure 2.

When counterclockwise rotation of the motor rotor 22 is desired, the plate 40 is placed as viewed in Figure 1, with an arrow 142 indicating such direction, and an arrow 144 indicating the terminals 34 or 36, in this case the terminal 34, to which the battery terminal 38 should be connected.

Figure 3 indicates the reverse side of the plate 40, as it is positioned on the panel 26 of Figure 1 for clockwise direction of rotation of the motor rotor 22, with an arrow 146 indicating clockwise direction, and an arrow 148 indicating that the battery terminal 38 should be connected to the terminal 36.

When the plate 40 is in the position of Figure 1 the motor is in condition for counterclockwise rotation, and the electrical circuit is set up, as indicated in Figure 5.

Starting with a battery or source of electromotive force 150, as indicated in Figure 5, with the battery grounded at one pole, the opposite pole is connected through a switch 152 to the battery terminal 38 on the terminal 34, from the latter of which the circuit divides through one branch including a series field 154 of the motor 18, the terminal 36, the jumper 46, the terminal 35 and interpole windings 156 of the motor to brushes 158 of a commutator 160. From the terminal 34, the other branch of the battery circuit is connected through the jumper 42, the terminal 31, a shunt field 162 of the motor, the terminal 33, the jumper 44 and the terminal 32 to brushes 164 of the commutator and to ground, this being a conventional circuit for a compound wound direct current motor, except for the panel 26, the plate 40 and associated parts of the present invention.

The direction of rotation of the motor rotor 22 is reversed, by reversing the plate 40 from its position of Figures 1 and 5, to its positions of Figures 3 and 6, in the latter of which the circuit is apparent.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a motor circuit terminal supporting insulating panel adapted to be mounted on a motor and having two rows of three terminals each severally projecting from the panel, two of the end terminals of one of which rows are each adapted to selectively receive a battery terminal, an apertured insulating terminal plate having embedded therein three jumpers, one of which has plate aperture registering openings fitting corresponding end terminals of said rows and the others of which each has similar openings fitting the other two elements of the respective rows, said plate being selectively reverse sidedly positionable on said panel with the jumper openings fitting the panel terminals and the battery terminal correspondingly connected to one of said end terminals of said one row to change the motor circuit from a condition under which the rotor rotates in one direction to a condition under which the rotor rotates in the opposite direction, and means for securing said plate to the panel and said jumpers and battery terminal to the panel terminals in each selected position of said plate.

2. The combination of a motor, a circuit terminal supporting insulating panel mounted on the motor having two rows of three terminals each and severally projecting from the panel, two of the end terminals of one of which rows are each adapted to receive a battery terminal, an apertured insulating terminal plate having therein three jumpers, one of which has plate aperture registering openings fitting corresponding end terminals of said rows and the others of which each has similar openings fitting the other two terminals of one of the rows, said plate being selectively reverse-sidedly positionable on said panel with the jumper openings fitting the panel terminals and the battery terminal correspondingly connected to one of said end terminals of said one row to change the motor circuit from a condition, under which the motor rotor rotates in one direction, to a condition under which the rotor rotates in the opposite direction, and means on each side of the plate indicating the direction of rotation of the rotor according to the operative mounting of the plate relative to the panel.

ALPHONSE V. ALVINO.

REFERENCES CITED

The following references are of record in the file of this patent:

UNITED STATES PATENTS

| Number | Name | Date |
|---|---|---|
| 1,195,520 | Snideman | Aug. 22, 1916 |
| 1,501,497 | Schwarz | July 15, 1924 |
| 1,754,645 | Oswald | Apr. 15, 1930 |
| 1,760,874 | Lansing | June 3, 1930 |
| 1,902,954 | Hochfeld | Mar. 28, 1933 |
| 2,065,938 | Jessen | Dec. 29, 1936 |
| 2,321,999 | Dalton | June 15, 1943 |

FOREIGN PATENTS

| Number | Country | Date |
|---|---|---|
| 373,153 | Great Britain | May 17, 1932 |